(12) United States Patent
Wang et al.

(10) Patent No.: US 12,579,365 B2
(45) Date of Patent: Mar. 17, 2026

(54) INFORMATION ACQUISITION METHOD AND APPARATUS, DEVICE, AND MEDIUM

(71) Applicant: BEIJING YOUZHUJU NETWORK TECHNOLOGY CO., LTD., Beijing (CN)

(72) Inventors: Yijun Wang, Beijing (CN); Changzhi Sun, Beijing (CN); Hao Zhou, Beijing (CN); Lei Li, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 167 days.

(21) Appl. No.: 18/567,634

(22) PCT Filed: Jul. 4, 2022

(86) PCT No.: PCT/CN2022/103637
§ 371 (c)(1),
(2) Date: Dec. 6, 2023

(87) PCT Pub. No.: WO2023/280106
PCT Pub. Date: Jan. 12, 2023

(65) Prior Publication Data
US 2024/0273295 A1 Aug. 15, 2024

(30) Foreign Application Priority Data
Jul. 6, 2021 (CN) .......................... 202110762048.6

(51) Int. Cl.
G06F 40/295 (2020.01)
G06F 16/35 (2025.01)

(52) U.S. Cl.
CPC ............ G06F 40/295 (2020.01); G06F 16/35 (2019.01)

(58) Field of Classification Search
CPC ............................... G06F 40/295; G06F 16/35
(Continued)

(56) References Cited

U.S. PATENT DOCUMENTS 8,788,407 B1* 7/2014 Singh ................... G06Q 20/382
705/38
9,672,205 B2* 6/2017 Miller ................... G06F 40/295
(Continued)

FOREIGN PATENT DOCUMENTS

CN 107783960 A 3/2018
CN 110781305 A 2/2020
(Continued)

OTHER PUBLICATIONS

You W., "Biomedical event extraction based on deep contextual word representation and self-attention", Computer Engineering & Science, No. 9, Sep. 15, 2020, pp. 1670-1679.
(Continued)

*Primary Examiner* — Thuykhanh Le

(57) ABSTRACT

The present disclosure relates to an information obtaining method and apparatus, a device, and a medium. The method includes setting a label table corresponding to each sample sentence in a sample set, wherein row characters and column characters in the label table are set identically in accordance with an order of characters of the corresponding sample sentence; and marking cells composed of the row characters and the column characters in the label table with corresponding information category labels; taking each sample sentence in the sample set as input information to a model to be trained and the label table corresponding to each sample sentence as output information of the model to be trained, and performing model training according to a preset target function; and generating an information extraction model
(Continued)

based on parameters of the trained model to extract target sentence information by the information extraction model.

18 Claims, 6 Drawing Sheets

(58) Field of Classification Search
USPC .............................................................. 704/9
See application file for complete search history.

(56) References Cited

U.S. PATENT DOCUMENTS

| | | | | |
|---|---|---|---|---|
| 10,013,436 B1* | 7/2018 | Cai | ...................... | G06F 16/5866 |
| 10,535,017 B2* | 1/2020 | Johnson | ................. | G06N 20/00 |
| 10,740,561 B1* | 8/2020 | Cao | ........................ | G06F 40/284 |
| 11,170,154 B1* | 11/2021 | Van Dyke | ............. | G06F 40/183 |
| 11,520,762 B2* | 12/2022 | Dash | ........................ | G06F 18/24 |
| 11,734,937 B1* | 8/2023 | Pushkin | .............. | G06F 18/2155 |
| | | | | 706/12 |
| 2009/0319257 A1* | 12/2009 | Blume | .................... | G06F 40/55 |
| | | | | 704/7 |
| 2011/0231382 A1* | 9/2011 | Xu | ......................... | G06F 16/953 |
| | | | | 707/723 |
| 2014/0046877 A1* | 2/2014 | Gopalakrishnan | ........................... | |
| | | | | G06F 16/2465 |
| | | | | 706/12 |
| 2014/0250111 A1* | 9/2014 | Morton | ................... | G06F 16/24 |
| | | | | 707/723 |
| 2015/0120653 A1* | 4/2015 | Luo | ......................... | G06F 16/35 |
| | | | | 707/610 |
| 2015/0199363 A1* | 7/2015 | Morton | ................... | G06F 16/24 |
| | | | | 707/722 |
| 2016/0078398 A1* | 3/2016 | Lu | ........................... | G06F 16/35 |
| | | | | 705/28 |
| 2016/0147871 A1 | 5/2016 | Kalyanpur et al. | | |
| 2016/0224473 A1* | 8/2016 | Acar | ................... | G06F 16/328 |
| 2016/0321243 A1* | 11/2016 | Walia | .................... | G06F 40/279 |
| 2017/0004184 A1* | 1/2017 | Jain | ......................... | G06F 16/35 |
| 2017/0235820 A1* | 8/2017 | Conrad | ................. | G06F 40/295 |
| | | | | 707/728 |
| 2017/0351749 A1 | 12/2017 | Quirk et al. | | |
| 2018/0060302 A1* | 3/2018 | Liang | ...................... | G06F 16/35 |
| 2018/0157643 A1* | 6/2018 | Andrassy | ................ | G06F 40/30 |
| 2018/0157741 A1* | 6/2018 | Allen | .................... | G06F 40/177 |
| 2018/0232443 A1 | 8/2018 | Delgo et al. | | |
| 2019/0095599 A1* | 3/2019 | Iliofotou | ............... | G06F 16/337 |
| 2019/0213258 A1* | 7/2019 | Bacarella | ............. | G06F 40/295 |
| 2019/0213259 A1* | 7/2019 | Bacarella | ............. | H04L 67/104 |
| 2019/0213260 A1* | 7/2019 | Bacarella | ............. | H04L 67/104 |
| 2019/0354544 A1* | 11/2019 | Hertz | ..................... | G06N 5/025 |
| 2020/0073933 A1 | 3/2020 | Zhao et al. | | |
| 2020/0320130 A1* | 10/2020 | Korpman | ............. | G06F 40/295 |
| 2021/0004537 A1* | 1/2021 | Sapugay | .............. | G06F 16/686 |
| 2021/0073247 A1* | 3/2021 | Zamfir | .................... | G06N 5/01 |
| 2021/0073302 A1* | 3/2021 | Srinivasaraghavan | ...................... | |
| | | | | G06F 40/205 |
| 2021/0089614 A1* | 3/2021 | Jain | ....................... | G06F 40/295 |
| 2021/0125615 A1* | 4/2021 | Medalion | ............... | G10L 15/26 |
| 2021/0133288 A1* | 5/2021 | Baughman | ........... | G06F 40/295 |
| 2021/0149901 A1* | 5/2021 | Fonseca de Lima | ...................... | |
| | | | | G06F 16/24522 |
| 2021/0224651 A1* | 7/2021 | Crone | ................... | G06F 40/295 |
| 2021/0397637 A1* | 12/2021 | Zhou | ..................... | G06F 18/214 |
| 2021/0406472 A1* | 12/2021 | Kato | ..................... | G06F 40/295 |
| 2022/0012633 A1* | 1/2022 | Molahalli | .............. | H04L 41/50 |
| 2022/0092096 A1* | 3/2022 | Yuan | .................... | G06N 3/0455 |
| 2022/0156461 A1* | 5/2022 | Li | ......................... | G06N 3/0455 |
| 2022/0172269 A1* | 6/2022 | Shan | ..................... | G06N 3/049 |
| 2022/0215175 A1* | 7/2022 | Li | .......................... | G06N 3/045 |
| 2022/0245347 A1* | 8/2022 | Wang | .................... | G06V 30/416 |
| 2022/0284192 A1* | 9/2022 | Pawar | .................... | G06N 3/045 |
| 2023/0195723 A1* | 6/2023 | Kaku | .................... | G06F 16/242 |
| | | | | 707/769 |
| 2023/0244704 A1* | 8/2023 | Tu | ............................ | G06N 3/09 |
| | | | | 704/9 |
| 2023/0351111 A1* | 11/2023 | Fauqueur | .............. | G06F 16/367 |
| 2023/0352192 A1* | 11/2023 | Yang | ..................... | G16H 70/40 |

FOREIGN PATENT DOCUMENTS

| | | | |
|---|---|---|---|
| CN | 111008276 A | 4/2020 | |
| CN | 111159365 A | 5/2020 | |
| CN | 111160008 A | 5/2020 | |
| CN | 111444715 A | 7/2020 | |
| CN | 111444721 A | 7/2020 | |
| CN | 111444723 A | 7/2020 | |
| CN | 112215004 A | 1/2021 | |
| CN | 112347759 A | 2/2021 | |
| CN | 112613306 A | 4/2021 | |
| CN | 112765956 A | 5/2021 | |
| CN | 113010638 A | 6/2021 | |
| CN | 113468330 A | 10/2021 | |
| WO | 2015/127855 A1 | 9/2015 | |
| WO | 2021114745 A1 | 6/2021 | |

OTHER PUBLICATIONS

Gupta P., "Table Filling Multi-Task Recurrent Neural Network for Joint Entity and Relation Extraction," ACL.

International Search Report and Written Opinion for International Application No. PCT/CN2022/103637, mailed Sep. 23, 2022, 15 Pages.

Rui F., et al., "The Construction of Learning Social Networking Sites in the Perspective of Connectionism," Journal of Distance Education, Apr. 18, 2013, Issue 3, pp. 10-16, (English Abstract on p. 16).

* cited by examiner

Setting a label table corresponding to each sample sentence in a sample set, where row characters and column characters in the label table are set identically in accordance with an order of characters of the corresponding sample sentence; and mark cells composed of the row characters and the column characters in the label table with corresponding information category labels ⟋⎯ 101

Taking each sample sentence in the sample set as input information to a model to be trained and the label table corresponding to each sample sentence as output information of the model to be trained, and performing model training according to a preset target function ⟋⎯ 102

Generating an information extraction model based on parameters of the trained model to extract target sentence information by the information extraction model ⟋⎯ 103

FIG. 1

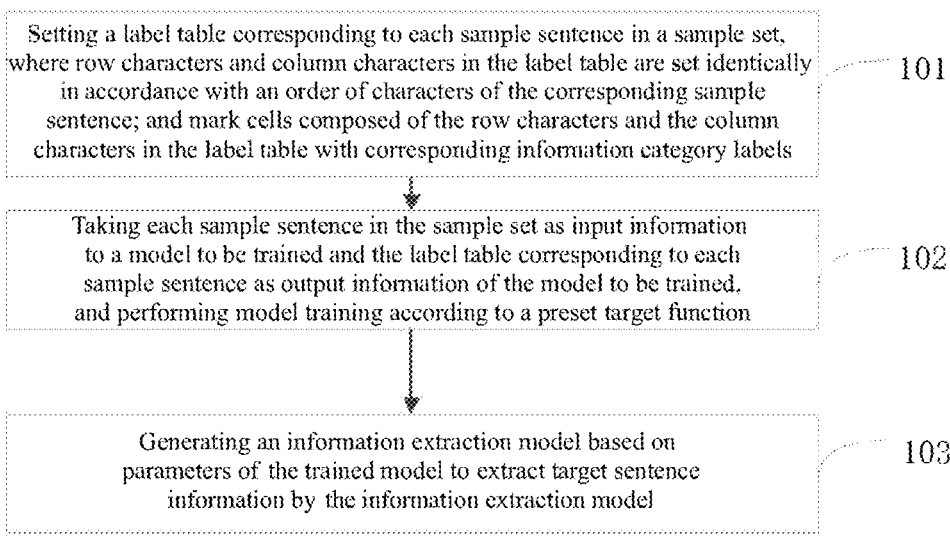

FIG. 2

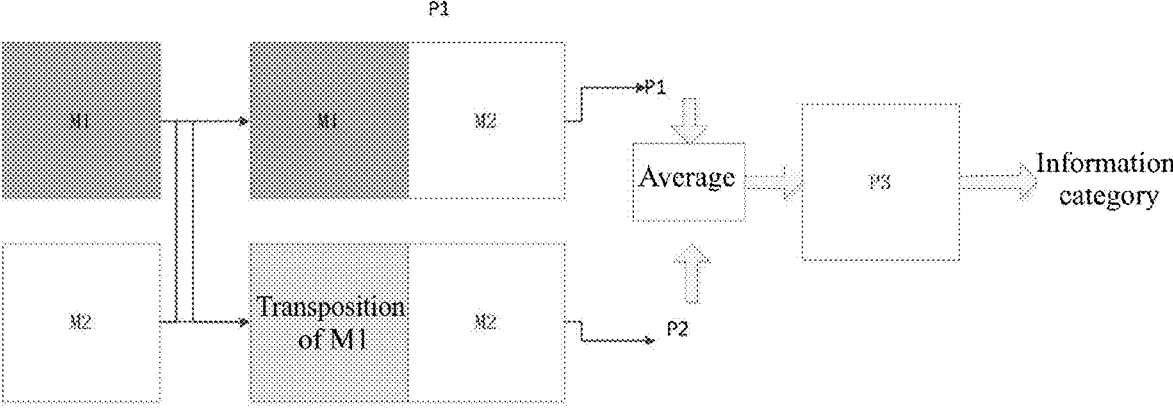

FIG. 5

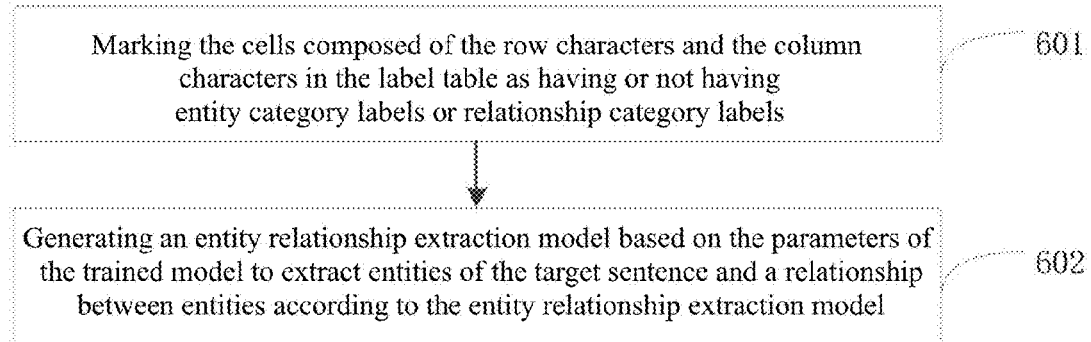

Marking the cells composed of the row characters and the column characters in the label table as having or not having entity category labels or relationship category labels — 601

Generating an entity relationship extraction model based on the parameters of the trained model to extract entities of the target sentence and a relationship between entities according to the entity relationship extraction model — 602

INFORMATION ACQUISITION METHOD AND APPARATUS, DEVICE, AND MEDIUM

CROSS-REFERENCE TO RELATED APPLICATIONS

This patent application is a U.S. National phase of International Patent Application No. PCT/CN2022/103637, filed on Jul. 4, 2022, which claims the priority of Chinese Patent Application No. 202110762048.6 filed with the China National Intellectual Property Administration on Jul. 6, 2021 and entitled "INFORMATION ACQUISITION METHOD AND DEVICE, EQUIPMENT AND MEDIUM". The disclosure of the aforementioned applications is incorporated by reference herein in their entireties as part of the present application.

TECHNICAL FIELD

The present disclosure relates to the field of data processing, and in particular, to an information obtaining method and apparatus, a device, and a medium.

BACKGROUND

With the development of the computer technology, information category extraction from a sentence has become a common data processing manner. For example, when information categories include an entity word character category and a corresponding relationship category, the extraction of the entity word character category and the corresponding relationship category is usually used as a key step in information extraction in downstream natural language processing tasks such as a question-answering system and a knowledge base.

In the related technology, information category extraction from a sentence is performed based on a pipeline method, that is, two models are established in advance, one model being configured to extract characters and the other model being configured to extract related information categories according to the characters. When extracting the information categories, the other model extracts the information categories on the basis of the extracted characters, that is, depending on a character extraction result of the one model.

However, since the pipeline method depends on the character extraction result when extracting the information categories, an error in character extraction will be inevitably propagated to the extraction of the information categories, leading to inaccurate extraction of character information categories from a sentence.

SUMMARY

To solve or solve at least in part the above-mentioned technical problems, the present disclosure provides an information obtaining method. The method includes setting a label table corresponding to each sample sentence in a sample set, wherein row characters and column characters in the label table are set identically in accordance with an order of characters of the corresponding sample sentence; and marking cells composed of the row characters and the column characters in the label table with corresponding information category labels; taking each sample sentence in the sample set as input information to a model to be trained and the label table corresponding to each sample sentence as output information of the model to be trained, and performing model training according to a preset target function; and

2 generating an information extraction model based on parameters of the trained model to extract target sentence information by the information extraction model.

The present disclosure further provides an information obtaining apparatus. The apparatus includes a setting module configured to: set a label table corresponding to each sample sentence in a sample set, wherein row characters and column characters in the label table are set identically in accordance with an order of characters of the corresponding sample sentence; and mark cells composed of the row characters and the column characters in the label table with corresponding information category labels; a model training module configured to take each sample sentence in the sample set as input information to a model to be trained and the label table corresponding to each sample sentence as output information of the model to be trained, and perform model training according to a preset target function; and an extraction module configured to generate an information extraction model based on parameters of the trained model to extract target sentence information by the information extraction model.

The present disclosure further provides an electronic device. The electronic device includes a processor; and a memory configured to store instructions executable by the processor, wherein the processor is configured to read the executable instructions from the memory and execute the instructions to implement the information obtaining method according to embodiments of the present disclosure.

The present disclosure further provides a computer-readable storage medium. The computer-readable storage medium has a computer program stored thereon, wherein the computer program is used to perform the information obtaining method according to embodiments of the present disclosure.

Compared with the related art, the technical solutions provided in the embodiments of the present disclosure have the following advantages:

According to the information obtaining solutions provided in the embodiments of the present disclosure, the label table corresponding to each sample sentence in the sample set is set, where the row characters and the column characters of the label table are set identically in accordance with the order of characters of the corresponding sample sentence; and the cells composed of the row characters and the column characters in the label table are marked with the corresponding information category labels. Then, each sample sentence in the sample set is taken as the input information to the model to be trained and the label table corresponding to each sample sentence as the output information of the model to be trained, and the model is trained according to the preset target function. Finally, the information extraction model is generated based on the parameters of the trained model to extract the target sentence information with the information extraction model. Thus, a label table is established with the characters of a sentence, and the information categories of and between the characters of the sentence are marked in the label table. Hence, the information extraction model trained based on the label table can efficiently and accurately extract information such as the information categories of the related sentence.

BRIEF DESCRIPTION OF THE DRAWINGS

The above and other features, advantages, and aspects of embodiments of the present disclosure will become more apparent by combining the accompanying drawings and referring to the following specific implementation methods.

Throughout the accompanying drawings, identical or similar reference numerals represent identical or similar elements. It should be understood that the attached drawings are illustrative, and the original and elements may not necessarily be drawn to scale.

FIG. 1 is a flowchart of an information obtaining method provided in embodiments of the present disclosure;

FIG. 2 is a structural schematic diagram of a label table provided in embodiments of the present disclosure;

FIG. 5 is a schematic diagram of an information extraction process provided in embodiments of the present disclosure;

FIG. 6 is a flowchart of another information obtaining method provided in embodiments of the present disclosure;

DETAILED DESCRIPTION

Figure 3:
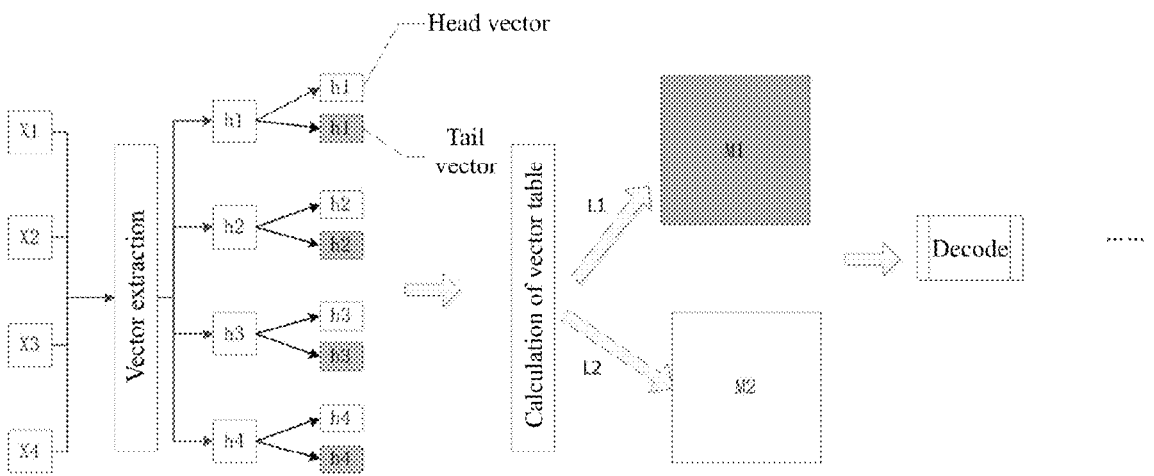
FIG. 3 is a schematic diagram of an information extraction model training scenario provided in embodiments of the present disclosure.

The embodiments of the present disclosure will be described in more detail below with reference to the accompanying drawings. Although certain embodiments of the present disclosure are shown in the accompanying drawings, it should be understood that the present disclosure can be implemented in various forms and should not be construed as limited to the embodiments described here. On the contrary, these embodiments are provided for a more thorough and complete understanding of the present disclosure. It should be understood that the accompanying drawings and embodiments disclosed in this disclosure are only for illustrative purposes and are not intended to limit the scope of protection of this disclosure.

It should be understood that the various steps recorded in the disclosed method implementation can be executed in different orders and/or in parallel. In addition, the method implementation may include additional steps and/or omitting the steps shown for execution. The scope of this disclosure is not limited in this regard.

The term "including" and its variations used herein are open-ended, meaning "including but not limited to". The term "based on" refers to "at least partially based on". The term "one embodiment" means "at least one embodiment". The term "another embodiment" means "at least one other embodiment". The term "some embodiments" means "at least some embodiments". The relevant definitions of other terms will be given in the following description.

It should be noted that the concepts such as "first" and "second" mentioned in this disclosure are only used to distinguish different devices, modules or units, and are not intended to limit the order or interdependence of the functions performed by these devices, modules or units.

It should be noted that the term "one" and "multiple" mentioned in this disclosure are indicative rather than restrictive, and those skilled in the art should understand that unless otherwise explicitly stated in the context, they should be understood as "one or more".

The names of the messages or information exchanged between multiple devices in the disclosed embodiments are for illustrative purposes only and are not intended to limit the scope of these messages or information.

To solve the above-mentioned problems, embodiments of the present disclosure provide an information obtaining method which will be described below in combination with specific embodiments.

FIG. 1 is a flowchart of an information obtaining method provided in embodiments of the present disclosure. The information obtaining method may be performed by an information obtaining apparatus which may be implemented by software and/or hardware and may be generally integrated in an electronic device. As shown in FIG. 1, the information obtaining method includes the following steps.

Step 101, a label table corresponding to each sample sentence in a sample set is set, where row characters and column characters of the label table are set identically in accordance with an order of characters of the corresponding sample sentence; and cells composed of the row characters and the column characters in the label table are marked with corresponding information category labels.

As mentioned above, the present disclosure is intended to extract an information category of a sentence. The information category may be any category of information that can be summed up with characters in the sentence (for example, the information category may be an entity word character category and a relationship category between entity word characters; for example, the information category may be a semantic field category between characters, etc.). The characters may refer to each character in the sample sentence.

To avoid an extraction error caused by separate extraction of characters and an information category between the characters, in the present embodiments, a label table corresponding to each sample sentence in a sample set is set. The label table is composed of rows and columns, and each of the rows and the columns is composed of the characters of each sample sentence. If the sample sentence includes n characters, the rows and the columns in the label table are composed of n characters; and the label table is an n*n square table and includes n*n cells.

The row characters and the column characters of the label table are set identically in accordance with the order of characters of the corresponding sample sentence. The identical setting mentioned herein refers to setting in the order from front to back in the corresponding sample sentence, or setting in the order from back to front in the corresponding sample sentence, or setting in a random order in the corresponding sample sentence. In other words, it is necessary to guarantee that the corresponding characters are set in the same order in the rows and the columns of the label table and to guarantee that corresponding characters in a row and a column numbered with the same number correspond to the same characters in the corresponding sample sentence. For example, if the sample sentence is an English sentence, the row characters and the column characters of the label table are set identically in accordance with the order of words of the corresponding English sentence. If the sample sentence is a Chinese sentence, the row characters and the column characters of the label table are set identically in accordance with the order of characters of the corresponding Chinese sentence.

In addition, the cells composed of the row characters and the column characters in the label table are marked with corresponding information category labels. Thus, the label table corresponding to each sample sentence includes information of two dimensions, one dimension being the information categories of the characters (the characters of the label table are all characters and do not need to be extracted preliminarily, and whether the characters have corresponding information categories is reflected in the label table) and the other dimension being the information categories between the characters. It is unnecessary to establish two individual models to extract the characters and the information categories, respectively. Moreover, in the embodiment of the present disclosure, the determination of the information categories requires merely the marking of the extraction results in the label table and does not depend on the extraction of the characters, guaranteeing the determination efficiency and accuracy of the information categories.

For example, as shown in FIG. 2, when the sample sentence 1 includes 10 characters "A, B, C, D, E, F, G, H, I, and J", the established label table has a size of 10*10, and the characters are set in the label table in the order from front to back according to all the characters in the sample sentence 1 (the corresponding information categories are represented by numbers in the label table). In the obtained label table, the corresponding information category labels are marked in the corresponding cells of the characters of the corresponding rows and columns. In the label table, a cell having no corresponding information category is marked with the information category label corresponding to "no information category" ("no information category" or "null information category" is represented by $\perp$ in the embodiments of the present disclosure). The information category labels marked in different cells may be the same or different. Thus, based on the label table, in addition to marking the characters corresponding to the cells having specific information categories, the characters corresponding to the cells having no information category may also be reflected. Therefore, the corresponding characters having information categories do not need to be extracted in advance, and based on the marking of the information category labels of the label table, each character and all character pairs in the related sentence are traversed, thereby the accuracy of information category extraction can be guaranteed.

Step 102, each sample sentence in the sample set is taken as input information to a model to be trained and the label table corresponding to each sample sentence as output information of the model to be trained, and the model is trained according to a preset target function.

In the present embodiments, after the label table of each sample sentence is determined, it is apparent that the information categories of the sample sentence are known. Therefore, to identify the information categories of the sample sentence in the related application scenario, in an embodiment of the present disclosure, each sample sentence in the sample set is taken as the input information to the model to be trained and the label table corresponding to each sample sentence as the output information of the model to be trained. The model is trained according to the preset target function, and the information extraction model obtained by training can be used to extract the information categories of related sentences.

It will be understood that during model training, to guarantee the model training effect, a target function for model training is preset. The target function is used for constraining that the information extraction model is capable of obtaining the corresponding label table from the sample sentence. The target function acts on the establishment of model parameters of the information extraction model, and the model parameters are obtained by learning relationships between sample sentences constrained by the target function and corresponding sample labels.

In the present embodiments, since the label table has some natural attributes reflecting corresponding information categories after the completion of the establishment of the label table, the preset target function is used for finding these natural attributes and constraining the model training according to these natural attributes. Thus, it can be guaranteed that the model parameters can reflect the natural attributes of the label table under the information categories to generate the label table of the related sentence. The natural attributes of the label table may be a shape feature, a position feature, and an implicit feature (any feature can be obtained by direct oblique deduction from the label table) of the label table under corresponding information categories. If the information categories in the label table are marked with regard to colors, the corresponding natural attributes may also include a color feature and the like.

In an embodiment of the present disclosure, a target function corresponding to the natural attributes of the label table may be deducted based on a form of a vector. For example, as shown in FIG. 3, the corresponding natural attributes of the label table of the sample sentence 2 include L1 and L2. The sample sentence 2 includes 4 characters "X1, X2, X3, and X4" which correspond to English words or Chinese characters, and vectors "h1, h2, h3, and h4" corresponding to the four characters are extracted. To determine the target function of the sample sentence 2 corresponding to the corresponding natural attributes in the vector dimension, two reference sub-vectors in each character vector are obtained. The reference sub-vectors may be determined according to a scenario requirement. In the present embodiments, a head vector $h_i^{head}$ and a tail vector $h_i^{end}$ of the vector of each character may be extracted as the corresponding reference sub-vectors, where the head vector is a corresponding vector when the character plays a role as a relationship originator and the tail vector is a corresponding vector when the character plays a role as a relationship receiver (where i is any natural number of 1 to 4).

Further, based on the natural attributes L1 and L2 in the label table corresponding to the sample sentence 2, a vector table M1 corresponding to the natural attribute L1 and a vector table M2 corresponding to the natural attribute L2 are established according to the head vector $h_i^{head}$ and the tail vector $h_i^{end}$ of the vector of each character, respectively, where vector values in the vector table M1 may be summed up to obtain a corresponding vector constraint function 1 under the natural attribute L1, and vector values in the vector table M2 may be summed up to obtain a corresponding vector constraint function 2 under the natural attribute L2. A reference target function for the corresponding information categories of the sample sentence 2 is obtained based on the vector constraint function 1 and the vector constraint function 2. A final target function is obtained according to the reference target functions for the corresponding information categories of all the sample sentences in the sample set.

Referring continuously to FIG. 3, to constrain the tendency of the vector table reflecting the corresponding natural attribute, a combination of the head vector $h_i^{head}$ and the tail vector $h_i^{end}$ may be set to generate a value of a weight parameter of the vector table. With values of different weight parameters, corresponding vector tables are more inclined to reflect corresponding natural attributes. When a vector table is generated according to a combination of the head vector $h_i^{head}$ and the tail vector $h_i^{end}$, the head vector of each character and the tail vectors of four characters are calculated using a biaffine model to obtain corresponding 4 vector values, and finally a corresponding 4*4 vector table is obtained from 4 head vectors. A grey level of each cell in the vector table reflects the vector value obtained based on the calculation of the combined vector, and as shown, different grey levels in the vector table represent different attribute reflection degrees under the corresponding natural attribute between two characters of the corresponding cell.

Thus, after the target function is obtained, the model is trained based on the target function such that the parameters of the model can learn and obtain natural attributes of the label table under corresponding information categories.

Step 103, an information extraction model is generated based on parameters of the trained model to extract target sentence information by the information extraction model.

Figure 4:
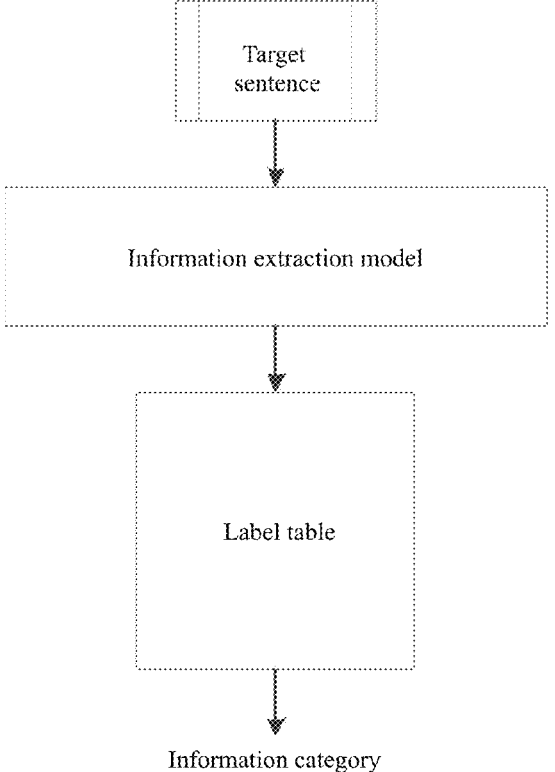
FIG. 4 is a flowchart of an information obtaining scenario provided in embodiments of the present disclosure.

In the present embodiments, the information extraction model is generated based on the parameters of the trained model to extract the target sentence information by the information extraction model. The target sentence information is categories of related characters of the input target sentence. As shown in FIG. 4, the target sentence is input to the corresponding information extraction model so that the corresponding label table can be known. Since corresponding category labels are marked in the label table, an information category of the related sentence can be extracted based on the label table.

Continuously taking the scenario shown in FIG. 3, for example, the information extraction model is in essence used to connect the vector tables corresponding to the natural attributes obtained by training the target sentence under the preset target function and decode the connected vector table to obtain corresponding labels.

With reference to FIG. 5, during decoding shown in FIG. 3, if the sample sentence 2 is input, after the vector table M1 corresponding to the natural attribute L1 and the vector table M2 corresponding to the natural attribute L2 are obtained, to synthesize all the natural attributes under a corresponding information category, the vector tables M1 and M2 are connected to obtain a connected vector table. During the connecting, the vector tables M1 and M2 may be directly connected to obtain the connected vector table P1, alternatively, the vector table M1 may be transposed and then connected with the vector table M2 to obtain the connected vector table P2. Then, according to the distribution characteristics of the vector values corresponding to the natural attributes, the vector values of the connected vector table P1 and vector table P2 are further denoised separately. The denoised vector values in the two vector tables are averaged to obtain a vector table P3. Information category identification is performed on the vector table P3 according to the distribution characteristics of the vector values corresponding to the natural attributes.

To sum up, according to the information obtaining method provided in the embodiments of the present disclosure, the label table corresponding to each sample sentence in the sample set is set, where the row characters and the column characters of the label table are set identically in accordance with the order of characters of the corresponding sample sentence; and the cells composed of the row characters and the column characters in the label table are marked with the corresponding information category labels. Then, each sample sentence in the sample set is taken as the input information to the model to be trained and the label table corresponding to each sample sentence as the output information of the model to be trained, and the model is trained according to the preset target function. Finally, the information extraction model is generated based on the parameters of the trained model to extract the target sentence information with the information extraction model. Thus, a label table is established with the characters of a sentence, and the information categories of and between the characters of the sentence are marked in the label table. Hence, the information extraction model trained based on the label table can efficiently and accurately extract information such as the information categories of the related sentence.

To enable those skilled in the art to understand the information obtaining method provided in the embodiments of the present disclosure more clearly, the following description is made below by taking for example the extraction of information categories being a character category and a relationship category between characters.

In an embodiment of the present disclosure, as shown in FIG. 6, the marking cells composed of the row characters and the column characters in the label table with corresponding information category labels includes the following steps.

Step 601, the cells composed of the row characters and the column characters in the label table are marked as having or not having entity category labels or relationship category labels.

The information category in the present embodiments is an entity category or a relationship category, that is, from the label table, a category of characters corresponding to entity words can be known (for example, the category of characters is a name entity word), or a relationship category between entity words can be known (for example, a social relationship category).

Figure 7:
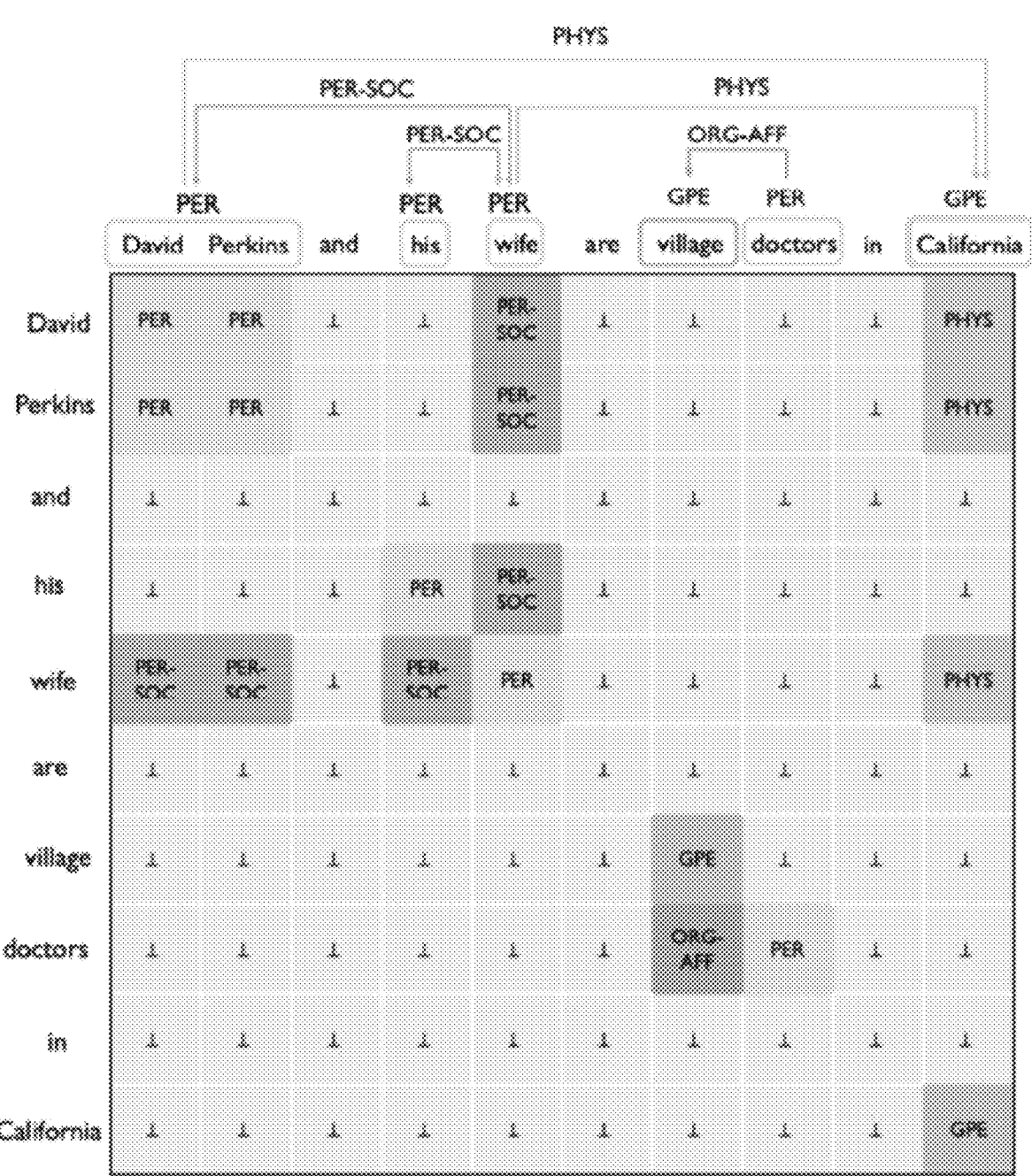
FIG. 7 is a structural schematic diagram of another label table provided in embodiments of the present disclosure.

For example, as shown in FIG. 7, when the characters included in the sample sentence 3 are "David Perkins and his wife are village doctors in California", the established label table is set in the order from front to back according to the English characters of the sample sentence 3. With reference to the entity category labels or the relationship category labels in the label table, the entity category labels for "David Perkins", "his", "wife", and "doctors" are a name entity (PER), and the entity category labels for "village" and "California" are a geographical position entity (GPE). There are 5 relationships between these entities. For example, "David", "Perkins", and "wife" have a social relationship between persons (PER-SOC); "David", "Perkins", and "California" have a neighborhood relationship between physical positions (PHYS); and "doctors" and "village" have an occupation-affiliation relationship between a local organization and an occupation (ORG-AFF).

Step 602, an entity relationship extraction model is generated based on the parameters of the trained model to extract entities of the target sentence and a relationship between entities according to the entity relationship extraction model.

In the present embodiments, the entity relationship extraction model is generated based on the parameters of the trained model to extract the entities of the target sentence and the relationship between entities according to the entity relationship extraction model.

As mentioned above, the label table having the entity category labels or the relationship category labels has a corresponding natural attribute. The natural attribute is that the entity category labels are distributed in a diagonal line of the label table. In other words, the cells composed of the row characters and the column characters in the diagonal line of the corresponding label table are marked as having or not having the entity category labels, and the cells composed of the row characters and the column characters not in the diagonal line of the corresponding label table are marked as having or not having the relationship category labels, where the relationship category labels are distributed symmetrically or asymmetrically about the diagonal line of the label table.

Referring continuously to FIG. 7, for the corresponding natural attributes in this table, "David" and "Perkins" correspond to a 2*2 square at the top left corner; "California" corresponds to a cell (square) at the bottom right corner; and the relationship PHYS between "David" and "Perkins" corresponds to a 2*1 rectangle at the top right corner. The upper triangular region represents a forward direction. For example, PHYS in the upper triangular region represents a relationship category between the character of the corresponding row and the character of the corresponding column but no relationship category between the character of the corresponding column and the character of the corresponding row. The lower triangular region represents a backward direction. For example, ORG-AFF in the lower triangular region represents a relationship category between the character of the corresponding column and the character of the corresponding row but no relationship category between the character of the corresponding row and the character of the corresponding column.

Figure 8:
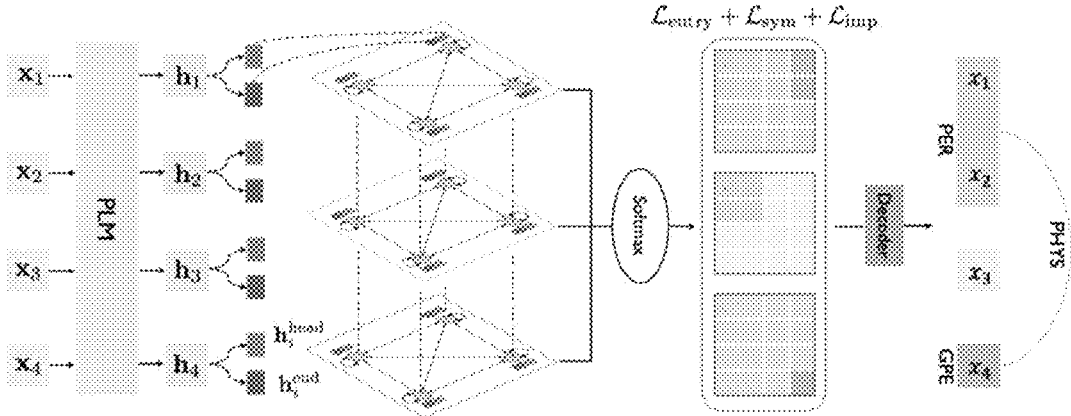
FIG. 8 is a schematic diagram of an extraction scenario of an entity relationship extraction model provided in embodiments of the present disclosure.

In the present embodiment, with reference to FIG. 8, the preset target function corresponding to the above-mentioned natural attributes includes a first loss function $L_{entry}$, a second loss function $L_{sym}$, and a third loss function $L_{imp}$. In some possible embodiments, a label classification probability representing the entity category label or the relationship category label corresponding to each cell in the label table corresponding to each sample sentence is determined according to a biaffine classification algorithm; and the label classification probability representing the entity category label or the relationship category label corresponding to each cell is calculated to determine the first loss function. The natural attribute corresponding to the first loss function is that the category label for each cell of the label table is relatively independent. Therefore, the label classification probability based on each cell corresponds to the above-mentioned natural attribute.

In the present embodiment, the first loss function may be as shown in the following Formula (1). In Formula (1), s represents the sample sentence; i and j are natural numbers; $y_{i,j}$ represents an information category label of the corresponding sample sentence; $Y_{i,j}$ represents a random variable of an information category, and a value of the variable is any information category label; and $P(Y_{i,j}|s)$=softmax(dropout $(g_{i,j})$), where softmax represents a predicted label classification probability for a score vector $g_{i,j}$ corresponding to the ith row and the jth column of the label table.

$$L_{entry} = \frac{1}{|s|^2}\sum\nolimits_{i=1}^{|s|}\sum\nolimits_{j=1}^{|s|}\log P(Y_{i,j}=y_{i,j}\mid s) \qquad \text{Formula (1)}$$

In the present embodiment, entity category label probabilities in the diagonal line of the label table and relationship category label probabilities distributed symmetrically about the diagonal line can be calculated to determine the second loss function. In the present embodiment, the natural attribute corresponding to the second loss function is that a shape constraint corresponding to each label category may be square or rectangular, i.e., a constraint for symmetry. For example, the category relationships of the row characters "David", "Perkins", and "wife" and the column characters "David", "Perkins", and "wife" in the label table are symmetrical about the diagonal line, and the second loss function is used to constrain the symmetry.

In the present embodiment, the second loss function may be as shown in the following Formula (2). In Formula (2), $P_{i,j,t}$ represents a category label for the cell of the ith row and the jth column; $P_{j,i,t}$ represents a probability of the cell of the jth row and the ith column being of category t; $y_{sym}$ represents a category label set symmetrical about the diagonal line; t represents a category label in the symmetrical label set; and (i,j) represents the cell of the ith row and the jth column.

$$L_{sym} = \frac{1}{|s|^2}\sum\nolimits_{i=1}^{|s|}\sum\nolimits_{j=1}^{|s|}\sum\nolimits_{t\in y_{sym}}|P_{i,j,t}-P_{j,i,t}| \qquad \text{Formula (2)}$$

In the embodiments of the present disclosure, entity category label probabilities in the diagonal line of the label table are further calculated according to a preset algorithm to determine the third loss function. The natural attribute corresponding to the third loss function may be construed as an implicit constraint in the label table. For example, if an entity relationship exits, it is implicit that there are inevitably two entities. This means that the probability of a relationship category is not greater than the corresponding entity category probability. For each character vector in the diagonal line of the label table, the possible probability thereof on an entity category is inevitably not lower than the possible probabilities of other characters of the same row or the same column on the relationship category. Therefore, the third loss function is established based on the implicit probability constraint.

In an embodiment of the present disclosure, the third loss function may be as shown in the following Formula (3). In Formula (3), [ ]$_*$ represents a calculation algorithm of a hinge loss function; $y_e$ represents an entity category set; $y_r$ represents a relationship category set; l represents a relationship category; t represents an entity category; and i represents the ith row or the ith column in the label table.

$$L_{imp} = \frac{1}{|s|}\sum\nolimits_{i=1}^{|s|}\left[\max_{l\in y_r}\{P_{i,:,l}-P_{:,i,l}\}-\max_{t\in y_e}\{P_{i,i,t}\}\right]_* \qquad \text{Formula (3)}$$

Then, the target function for training the entity relationship extraction model is $L_{entry}+L_{sym}+L_{imp}$.

Figure 9:
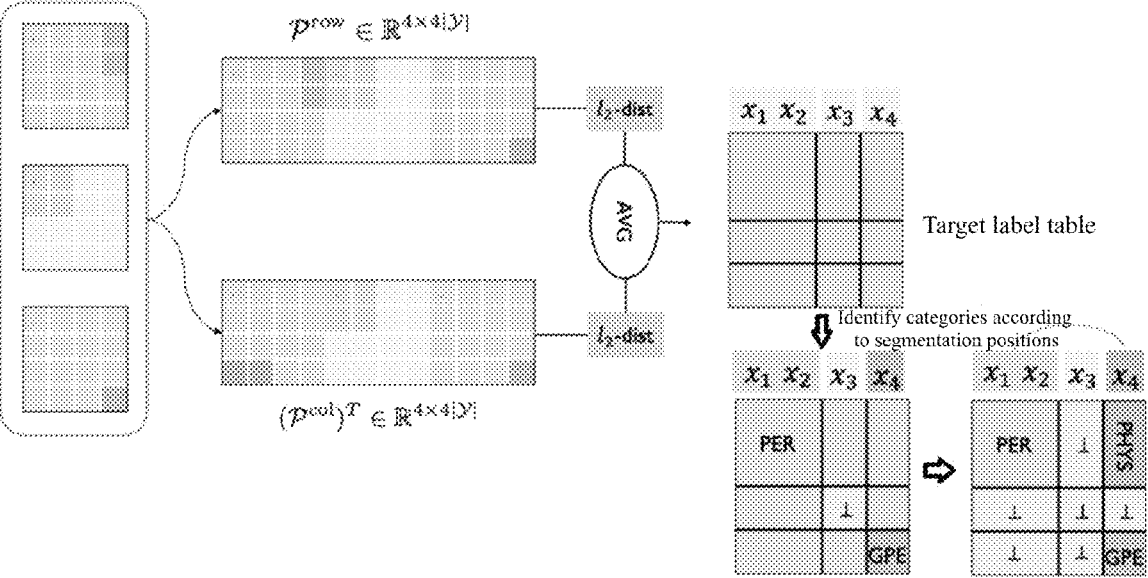
FIG. 9 is a schematic diagram of an extraction scenario of another entity relationship extraction model provided in embodiments of the present disclosure.

Further, with reference to FIG. 9, when the entity relationship model is trained based on the target function of the entity relationship extraction module, if the sample sentence is s and the sample sentence s includes the characters X1, X2, X3, and X4, the vectors h1, h2, h3, and h4 of all the characters are established according to a pre-trained language model (PLM). To better reflect a natural attribute, in the present embodiment, two multilayer perceptions (MLPs) are used: one MLP for extracting the head of the vector of each character and one MLP for extracting the tail of the vector of each character. In other words, the head vector $h_i^{head}$ and the tail vector $h_i^{end}$ are extracted from the vector of each character. In the present embodiment, an extraction formula for the head vector $h_i^{head}$ and the tail vector $h_i^{end}$ is as shown in Formula (4). In Formula (4), $h_i^{head}\in R^d$, $h_i^{end}\in R^d$ and R represent real number fields, and d represents a dimension of a feature vector.

$$h_i^{head} = MLPhead(h_i),\ h_i^{end} = MLPend(h_i) \qquad \text{Formula (4)}$$

Then, the head vector of the character h1 and the tail vectors of h1, h2, h3, and h4 are connected into 4 combined vectors. Corresponding score vectors for every two combined vectors of the 4 combined vectors are calculated according to algorithms such as a biaffine algorithm, and a vector table 1 is generated according to all the score vectors. To ensure that the vector table 1 reflects a constraint corresponding to the first loss function, the score vectors are calculated according to weight parameters corresponding to the first loss function, and the score vectors are determined according to the weight parameters. Specific calculation may be performed with reference to Formulas (5) and (6). In Formula (5), $g_{i,j}$ represents a score vector, $g_{i,j} \in R^{|y|}$, $U_1 \in R^{|y| \times d \times d}$, $b \in R^{|y|}$, $U_2 \in R^{|y| \times 2d}$; R represents a real number field; Y represents a category label space; b represents a preset deviation; $\oplus$ represents vector connecting: the formula shows merely the connecting of the vectors h1 (representing $h_i^{head}$ in Formula (5)) and h2 (representing $h_i^{end}$ in Formula (5)); Biaff represents the biaffine algorithm; and $U_1$ and $U_2$ represent corresponding weight parameters.

$$g_{i,j} = Biaff\left(h_i^{head},\ h_j^{end}\right) \qquad \text{Formula (5)}$$

$$Biaff(h1,\ h2) = h_1^T U_1 h_2 + U_2(h1 \oplus h2) + b \qquad \text{Formula (6)}$$

Similarly, the head vector of the character h2 and the tail vectors of h1, h2, h3, and h4 are connected into 4 combined vectors. Corresponding score vectors for every two combined vectors of the 4 combined vectors are calculated according to algorithms such as a bimodal algorithm, and a vector table 2 is generated according to all the score vectors. To ensure that the vector table 2 reflects a constraint corresponding to the second loss function, the score vectors are calculated according to weight parameters corresponding to the second loss function. The head vector of the character h3 and the tail vectors of h1, h2, h3, and h4 are connected into 4 combined vectors. Corresponding score vectors for every two combined vectors of the 4 combined vectors are calculated according to algorithms such as the bimodal algorithm, and a vector table 3 is generated according to all the score vectors. To ensure that the vector table 3 reflects a constraint corresponding to the third loss function, the score vectors are calculated according to weight parameters corresponding to the third loss function.

Based on the corresponding score vectors, the vector tables corresponding to the first loss function, the second loss function, and the third loss function for constraining the corresponding related attributes can be eventually obtained. Based on the vector table ($p^{row} \in R^{4 \times 4 |y|}$, where $p^{row}$ is a two-dimensional matrix into which P is expanded by row; R represents a real number field; and Y represents a category label space) of the first loss function, the vectors corresponding to the second loss function and the third loss function are connected to obtain a first connected vector table. Based on the transposition (($P^{col})^T \in R^{4 \times 4|y|}$, where $P^{col}$ is a two-dimensional matrix into which P is expanded by column) of the vector table of the first loss function, the vectors corresponding to the second loss function and the third loss function are connected to obtain a second connected vector table.

It can be understood that a natural attribute in the label table includes that: the corresponding characters of a row and a column are completely identical, and if an entity word character in the row has, for example, a category relationship with an entity word character in the column, the entity word character in the corresponding column inevitably has the entity word character in the corresponding row. Such a natural attribute may be reflected in rows and columns in the connected vector table obtained according to the loss functions. Therefore, a Euclidean distance (i.e., distance $l_2$) between adjacent rows of the first connected vector table may be calculated to obtain one $l_2$-dist, and a Euclidean distance between adjacent columns of the second connected vector table may be calculated to obtain the other $l_2$-dist. Then, after averaging of the two $l_2$-dist, the label categories of the cells are divided by the natural attribute according to the vector values of the obtained vector table.

In the present embodiment, all entities and relationships need to be recovered from a target label table predicted by the entity relationship extraction model, which is equivalent to a reverse transformation process, i.e., the decoding process.

In the present embodiments, firstly, the characters of the target sentence are processed according to the entity relationship extraction model to generate a target label table corresponding to the target sentence, where the target label table includes predicted scores corresponding to the cells composed of the row characters and the column characters. The predicted scores may be construed as vector values of the vector table obtained after averaging the Euclidean distances of rows and columns. The predicted scores corresponding to the cells composed of the row characters and the column characters in the target label table are calculated to determine segmentation positions related to the entity category labels in the target label table. That is to say, the label categories of the cells are divided by the above-mentioned natural attributes. In the present embodiments, whether the predicted scores for the cells in the diagonal line in the target label table meet the entity category labels is determined according to the segmentation positions, and if yes, the corresponding entity category labels are marked; whether the predicted scores for the cells not in the diagonal line in the target label table meet the relationship category labels is determined according to the segmentation positions, and if yes, the corresponding relationship category labels are marked; and a relationship between entities corresponding to the target sentence is generated according to the entity category labels and the relationship category labels marked in the target label table.

It will also be understood there are many natural attributes in the vector table obtained by decoding. For example, an entity inevitably corresponds to a square, and the square is definitely in the diagonal line (symmetrical about the diagonal line). A relationship definitely corresponds to a rectangle, and the rectangle certainly does not overlap the diagonal line, and is in the upper triangle or the lower triangle. In addition, there is also the most important attribute: the rows (columns) corresponding to a plurality of corresponding characters included in one entity are definitely identical and different from the rows (columns) not corresponding to the entity word character. Based on this attribute, the first step of our algorithm is to determine the position of the entity.

Specifically, in the vector tables obtained by averaging the Euclidean distances of rows and columns, whether two adjacent rows (columns) are consistent is determined, and if yes, the two words are within one entity, and if no, it indicates that the two words inevitably do not belong to the same entity and there is an entity boundary therebetween. Thus, all entity boundaries can be found out efficiency. After all entity boundaries are found out, it is equivalent that entities are divided into many parts. Each part may be an entity. Next, whether each part is an entity is determined one by one. That is, a corresponding square part that may serve as the entity may be determined from the many parts, and according to all the vector values of the square, the entity label of the part is obtained or the part is not an entity. After all entity word characters are found out, next whether any two entities have a relationship is determined. All entity pairs in the square part can be traversed, and a prediction result is determined according to all vectors included in the rectangles corresponding to the entity pairs, thereby determining that there is a relationship category or no relationship category between the entity pair.

To sum up, according to the information obtaining method of the embodiments of the present disclosure, the entity relationship extraction model can be established, and the entity categories or the relationship categories can be obtained accurately and efficiently based on the entity relationship extraction model.

Figure 10:
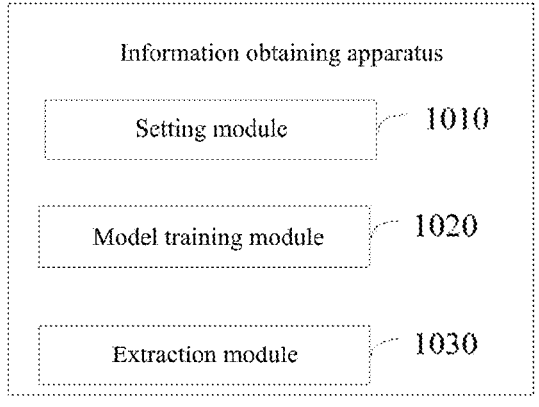
FIG. 10 is a structural schematic diagram of an information obtaining apparatus according to an embodiment of the present disclosure.

To implement the foregoing embodiments, the present disclosure further provides an information obtaining apparatus. FIG. 10 is a structural schematic diagram of an information obtaining apparatus according to an embodiment of the present disclosure. As shown in FIG. 10, the information obtaining apparatus includes a setting module 1010, a model training module 1020, and an extraction module 1030.

The setting module 1010 is configured to: set a label table corresponding to each sample sentence in a sample set, where row characters and column characters of the label table are set identically in accordance with an order of characters of the corresponding sample sentence; and mark cells composed of the row characters and the column characters in the label table with corresponding information category labels.

The model training module 1020 is configured to take each sample sentence in sample set as input information to a model to be trained and label table corresponding to each sample sentence as output information of the model to be trained, and train the model according to a preset target function.

The extraction module 1030 is configured to generate an information extraction model based on parameters of the trained model to extract target sentence information with the information extraction model.

The information obtaining apparatus provided in the embodiments of the present disclosure is capable of performing the information obtaining method provided in any embodiment of the present disclosure and has corresponding functional modules for performing the method and beneficial effects.

To implement the foregoing embodiments, the present disclosure further provides a computer including a computer program/instructions, where when the computer program/instructions is/are executed by a processor, the information processing method described in the foregoing embodiments is implemented.

Figure 11:
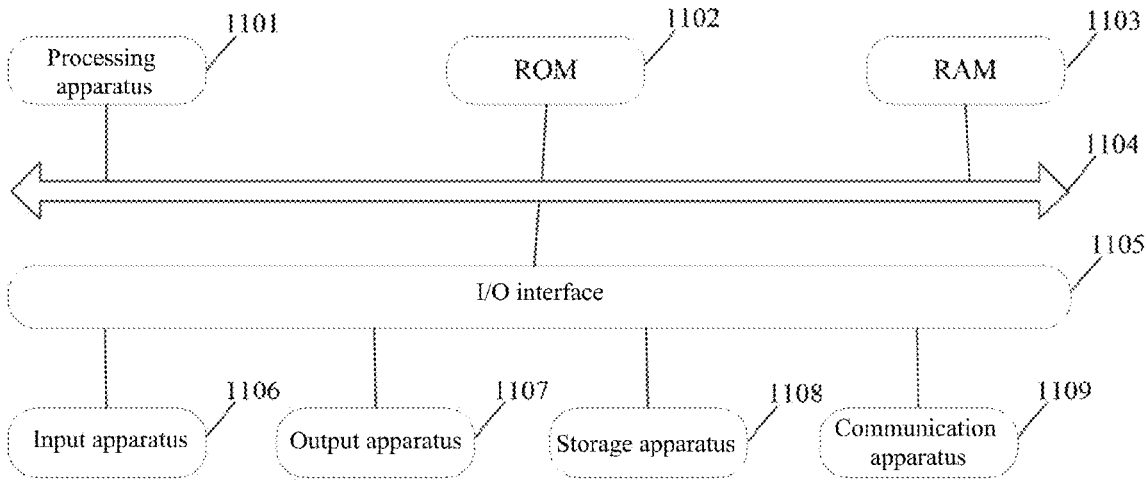
FIG. 11 is a structural schematic diagram of an electronic device provided in embodiments of the present disclosure.

FIG. 11 is a structural schematic diagram of an electronic device provided in an embodiment of the present disclosure.

The following description is made specifically with reference to FIG. 11 which is a structural schematic diagram of an electronic device 1100 adapted to implement the embodiments of the present disclosure. The electronic device 1100 in the embodiments of the present disclosure may include but not be limited to mobile terminals such as a mobile phone, a notebook computer, a digital broadcasting receiver, a personal digital assistant (PDA), a portable Android device (PAD), a portable media player (PMP), and a vehicle-mounted terminal (e.g., a vehicle-mounted navigation terminal), and fixed terminals such as a digital TV and a desktop computer. The electronic device shown in FIG. 11 is merely an example, and should not pose any limitation to the functions and the range of use of the embodiments of the present disclosure.

As shown in FIG. 11, the electronic device 1100 may include a processing apparatus (e.g., a central processing unit, a graphics processing unit) 1101, which can perform various suitable actions and processing according to a program stored on the read-only memory (ROM) 1102 or a program loaded from the storage apparatus 1108 into the random-access memory (RAM) 1103. The RAM 1103 further stores various programs and data required for operations of the electronic device 1100. The processing apparatus 1101, the ROM 1102, and the RAM 1103 are interconnected by means of a bus 1104. An input/output (I/O) interface 1105 is also connected to the bus 1104.

Usually, the following apparatuses may be connected to the I/O interface 1105: an input apparatus 1106 including, for example, a touch screen, a touch pad, a keyboard, a mouse, a camera, a microphone, an accelerometer, and a gyroscope; an output apparatus 1107 including, for example, a liquid crystal display (LCD), a loudspeaker, and a vibrator; a storage apparatus 1108 including, for example, a magnetic tape and a hard disk; and a communication apparatus 1109. The communication apparatus 1109 may allow the electronic device 1100 to be in wireless or wired communication with other devices to exchange data. While FIG. 11 illustrates the electronic device 1100 having various apparatuses, it is to be understood that all the illustrated units are not necessarily implemented or included. More or less apparatuses may be implemented or included alternatively.

Particularly, according to the embodiments of the present disclosure, the process described above with reference to the flowchart may be implemented as a computer software program. For example, an embodiment of the present disclosure includes a computer program product, which includes a computer program carried by a non-transitory computer-readable medium. The computer program includes a program code for performing the method shown in the flowchart. In such an embodiment, the computer program may be downloaded online through the communication apparatus 1109 and installed, or installed from the storage apparatus 1108, or installed from the ROM 1102. When the computer program is executed by the processing apparatus 1101, the functions defined in the information obtaining method of the embodiments of the present disclosure are executed.

It needs to be noted that the computer readable medium described above in the present disclosure may be a computer readable signal medium or a computer readable storage medium or any combination thereof. For example, the computer-readable storage medium may be, but not limited to, an electric, magnetic, optical, electromagnetic, infrared, or semiconductor system, apparatus or device, or any combination of them. More specific examples of the computer-readable storage medium may include but not be limited to: an electrical connection with one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries thereon a computer-readable program code. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable storage medium may send, propagate or transmit a program used by or in combination with an instruction execution system, apparatus or device. The program code included on the computer-readable medium may be transmitted by using any suitable medium, including but not limited to an electric wire, a fiber-optic cable, radio frequency (RF) and the like, or any appropriate combination thereof.

In some implementations, a client and a server may communicate by means of any network protocol currently known or to be developed in future such as Hyper Text Transfer Protocol (HTTP), and can achieve communication and interconnection with digital data (e.g., a communication network) in any form or of any medium. Examples of the communication network include a local area network (LAN), a wide area network (WAN), an internet work (e.g., the Internet), a peer-to-peer network (e.g., ad hoc peer-to-peer network), and any network currently known or to be developed in future.

The above-mentioned computer-readable medium may be included in the electronic device described above, or may exist alone without being assembled with the electronic device.

The above-mentioned computer readable medium may carry one or more programs which, when executed by the electronic device, cause the electronic device to:

set a label table corresponding to each sample sentence in a sample set, where row characters and column characters of the label table are set identically in accordance with an order of characters of the corresponding sample sentence; and mark cells composed of the row characters and the column characters in the label table with corresponding information category labels; then take each sample sentence in the sample set as input information to a model to be trained and the label table corresponding to each sample sentence as output information of the model to be trained, and train the model according to a preset target function; and finally, generate an information extraction model based on parameters of the trained model to extract target sentence information with the information extraction model. Thus, a label table is established with the characters of a sentence, and the information categories of and between the characters of the sentence are marked in the label table. Hence, the information extraction model trained based on the label table may efficiently and accurately extract information such as the information categories of the related sentence.

A computer program code for performing the operations in the present disclosure may be written in one or more programming languages or a combination thereof. The programming languages include but are not limited to object oriented programming languages, such as Java, Smalltalk, and C++, and conventional procedural programming languages, such as C or similar programming languages. The program code can be executed fully on a user's computer, executed partially on a user's computer, executed as an independent software package, executed partially on a user's computer and partially on a remote computer, or executed fully on a remote computer or a server. In a circumstance in which a remote computer is involved, the remote computer may be connected to a user computer via any type of network, including a local area network (LAN) or a wide area network (WAN), or may be connected to an external computer (for example, connected via the Internet by using an Internet service provider).

The flowcharts and block diagrams in the accompanying drawings illustrate system architectures, functions and operations that may be implemented by the system, method and computer program product according to the embodiments of the present disclosure. In this regard, each block in the flowcharts or block diagrams may represent a module, a program segment or a part of code, and the module, the program segment or the part of code includes one or more executable instructions for implementing specified logic functions. It should also be noted that in some alternative implementations, functions marked in the blocks may also take place in an order different from the order designated in the accompanying drawings. For example, two consecutive blocks can actually be executed substantially in parallel, and they may sometimes be executed in a reverse order, which depends on involved functions. It should also be noted that each block in the flowcharts and/or block diagrams and combinations of the blocks in the flowcharts and/or block diagrams may be implemented by a dedicated hardware-based system for executing specified functions or operations, or may be implemented by a combination of dedicated hardware and computer instructions.

Related units described in the embodiments of the present disclosure may be implemented by software, or may be implemented by hardware. The name of a unit does not constitute a limitation on the unit itself.

The functions described above herein may be performed at least in part by one or more hardware logic components. For example, exemplary types of hardware logic components that can be used without limitations include a field programmable gate array (FPGA), an application specific integrated circuit (ASIC), an application specific standard product (ASSP), a system on chip (SOC), a complex programmable logic device (CPLD), and the like.

In the context of the present disclosure, a machine-readable medium may be a tangible medium that may include or store a program for use by or in combination with an instruction execution system, apparatus or device. The machine-readable medium may be a machine-readable signal medium or a machine-readable storage medium. The machine-readable medium may include but be not limited to an electronic, magnetic, optical, electromagnetic, infrared, or semiconductor system, apparatus or device, or any appropriate combination thereof. More specific examples of the machine-readable storage medium may include an electrical connection with one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination thereof.

According to one or more embodiments of the present disclosure, the present disclosure provides an information obtaining method, including: setting a label table corresponding to each sample sentence in a sample set, where row characters and column characters of the label table are set identically in accordance with an order of characters of the corresponding sample sentence; and marking cells composed of the row characters and the column characters in the label table with corresponding information category labels;

taking each sample sentence in the sample set as input information to a model to be trained and the label table corresponding to each sample sentence as output information of the model to be trained, and training the model according to a preset target function; and generating an information extraction model based on parameters of the trained model to extract target sentence information by the information extraction model.

According to one or more embodiments of the present disclosure, the information obtaining method provided in the present disclosure further includes:

if the sample sentence is an English sentence, identically setting the row characters and the column characters of the label table in accordance with an order of words of the corresponding English sentence; and if the sample sentence is a Chinese sentence, identically setting the row characters and the column characters of the label table in accordance with the order of characters of the corresponding Chinese sentence.

According to one or more embodiments of the present disclosure, in the information obtaining method provided in the present disclosure, the marking cells composed of the row characters and the column characters in the label table with corresponding information category labels includes:

marking the cells composed of the row characters and the column characters in the label table as having or not having the entity category labels or the relationship category labels; and the generating an information extraction model based on parameters of the trained model to extract target sentence information by the information extraction model includes:

generating an entity relationship extraction model based on the parameters of the trained model to extract entities of the target sentence and a relationship between entities according to the entity relationship extraction model.

According to one or more embodiments of the present disclosure, in the information obtaining method provided in the present disclosure, the marking the cells composed of the row characters and the column characters in the label table as having or not having the entity category labels or the relationship category labels includes:

marking the cells composed of the row characters and the column characters in a diagonal line of the label table as having or not having the entity category labels; and marking the cells composed of the row characters and the column characters not in the diagonal line of the label table as having or not having the relationship category labels, where the relationship category labels are distributed symmetrically or asymmetrically about the diagonal line of the label table.

According to one or more embodiments of the present disclosure, in the information obtaining method provided in the present disclosure, the preset target function corresponding to the entity relationship extraction model includes a first loss function which is determined by:

determining a label classification probability representing the entity category label or the relationship category label corresponding to each cell in the label table corresponding to each sample sentence according to a biaffine classification algorithm; and calculating the label classification probability representing the entity category label or the relationship category label corresponding to each cell to determine the first loss function.

According to one or more embodiments of the present disclosure, in the information obtaining method provided in the present disclosure, the preset target function corresponding to the entity relationship extraction model includes a second loss function which is determined by:

calculating entity category label probabilities in the diagonal line of the label table and relationship category label probabilities distributed symmetrically about the diagonal line to determine the second loss function.

According to one or more embodiments of the present disclosure, in the information obtaining method provided in the present disclosure, the preset target function corresponding to the entity relationship extraction model includes a third loss function which is determined by:

calculating entity category label probabilities in the diagonal line of the label table according to a preset algorithm to determine the third loss function.

According to one or more embodiments of the present disclosure, in the information obtaining method provided in the present disclosure, the generating an entity relationship extraction model based on the parameters of the trained model to extract entities of the target sentence and a relationship between entities according to the entity relationship extraction model includes:

processing characters of the target sentence according to the entity relationship extraction model to generate a target label table corresponding to the target sentence, where the target label table includes predicted scores corresponding to the cells composed of the row characters and the column characters;

calculating the predicted scores corresponding to the cells composed of the row characters and the column characters in the target label table to determine segmentation positions related to the entity category labels in the target label table;

determining whether the predicted scores for the cells in the diagonal line in the target label table meet the entity category labels according to the segmentation positions, and if yes, marking with the corresponding entity category labels;

determining whether the predicted scores for the cells not in the diagonal line in the target label table meet the relationship category labels according to the segmentation positions, and if yes, marking with the corresponding relationship category labels; and generating the entities of the target sentence and the relationship between entities corresponding to the target sentence according to the entity category labels and the relationship category labels marked in the target label table.

According to one or more embodiments of the present disclosure, the present disclosure provides an information obtaining apparatus, including: a setting module configured to: set a label table corresponding to each sample sentence in a sample set, where row characters and column characters of the label table are set identically in accordance with an order of characters of the corresponding sample sentence; and mark cells composed of the row characters and the column characters in the label table with corresponding information category labels;

a model training module configured to take each sample sentence in the sample set as input information to a model to be trained and the label table corresponding to each sample sentence as output information of the model to be trained, and train the model according to a preset target function; and an extraction module configured to generate an information extraction model based on parameters of the trained model to extract target sentence information by the information extraction model.

According to one or more embodiments of the present disclosure, the information obtaining apparatus provided in the present disclosure further includes an order setting module configured to:

if the sample sentence is an English sentence, identically set the row characters and the column characters of the label table in accordance with an order of words of the corresponding English sentence; and if the sample sentence is a Chinese sentence, identically set the row characters and the column characters of the label table in accordance with the order of characters of the corresponding Chinese sentence.

According to one or more embodiments of the present disclosure, in the information obtaining apparatus provided in the present disclosure, the setting module is specifically configured to:

mark the cells composed of the row characters and the column characters in the label table as having or not having entity category labels or relationship category labels; and the generating an information extraction model based on parameters of the trained model to extract target sentence information by the information extraction model includes:

generating an entity relationship extraction model based on the parameters of the trained model to extract entities of the target sentence and a relationship between entities according to the entity relationship extraction model.

According to one or more embodiments of the present disclosure, in the information obtaining apparatus provided in the present disclosure, the cells composed of the row characters and the column characters in a diagonal line of the label table are marked as having or not having entity category labels; and the cells composed of the row characters and the column characters not in the diagonal line of the label table are marked as having or not having relationship category labels, where the relationship category labels are distributed symmetrically or asymmetrically about the diagonal line of the label table.

According to one or more embodiments of the present disclosure, in the information obtaining apparatus provided in the present disclosure, the setting module is specifically configured to:

determine a label classification probability representing the entity category label or the relationship category label corresponding to each cell in the label table corresponding to each sample sentence according to a biaffine classification algorithm; and calculate the label classification probability representing the entity category label or the relationship category label corresponding to each cell to determine the first loss function.

According to one or more embodiments of the present disclosure, in the information obtaining apparatus provided in the present disclosure, the preset target function corresponding to the entity relationship extraction model further includes:

calculating entity category label probabilities in the diagonal line of the label table and relationship category label probabilities distributed symmetrically about the diagonal line to determine the second loss function.

According to one or more embodiments of the present disclosure, in the information obtaining apparatus provided in the present disclosure, the preset target function corresponding to the entity relationship extraction model further includes:

the preset target function further includes:

calculating entity category label probabilities in the diagonal line of the label table according to a preset algorithm to determine the third loss function.

According to one or more embodiments of the present disclosure, in the information obtaining apparatus provided in the present disclosure, the setting module is specifically configured to:

process the characters of the target sentence according to the entity relationship extraction model to generate a target label table corresponding to the target sentence, where the target label table includes predicted scores corresponding to the cells composed of the row characters and the column characters;

calculate the predicted scores corresponding to the cells composed of the row characters and the column characters in the target label table to determine segmentation positions related to the entity category labels in the target label table;

determine whether the predicted scores for the cells in the diagonal line in the target label table meet the entity category labels according to the segmentation positions, and if yes, mark with the corresponding entity category labels;

determine whether the predicted scores for the cells not in the diagonal line in the target label table meet the relationship category labels according to the segmentation positions, and if yes, mark with the corresponding relationship category labels; and generate the entities of the target sentence and the relationship between entities corresponding to the target sentence according to the entity category labels and the relationship category labels marked in the target label table.

According to one or more embodiments of the present disclosure, the present disclosure provides an electronic device, including:

a processor; and a memory configured to store instructions executable by the processor, where the processor is configured to read the executable instructions from the memory and execute the instructions to implement any information obtaining method provided in the present disclosure.

According to one or more embodiments of the present disclosure, the present disclosure provides a computer readable storage medium with a computer program stored thereon. The computer program is used to perform the information method provided in the present disclosure.

The above description only refers to preferred embodiments of this disclosure and explanations of the technical principles used. Those skilled in the art should understand that the scope referred in this disclosure is not limited to technical solutions formed by specific combinations of the aforementioned technical features, but also covers other technical solutions formed by arbitrary combinations of the aforementioned technical features or their equivalent features without departing from the aforementioned disclosed concept. For example, a technical solution formed by replacing the above features with technical features (but not limited to) with similar functions disclosed in this disclosure.

Furthermore, although each operation is depicted in a specific order, this should not be understood as requiring them to be executed in the specific order shown or in a sequential order. In certain environments, multitasking and parallel processing may be advantageous. Similarly, although several specific implementation details are included in the above discussion, these should not be interpreted as limiting the scope of this disclosure. Some features described in the context of individual embodiments can also be combined and implemented in a single embodiment. On the contrary, various features described in the context of a single embodiment can also be implemented individually or in any suitable sub combination in multiple embodiments.

Although the subject matter has been described in language specific to structural features and/or method logical actions, it should be understood that the subject matter limited in the attached claims may not necessarily be limited to the specific features or actions described above. On the contrary, the specific features and actions described above are only exemplary forms of implementing the claims.

What is claimed is:

1. An information obtaining method, comprising:

setting a label table corresponding to each sample sentence in a sample set, wherein row characters and column characters in the label table are set identically in accordance with an order of characters of the corresponding sample sentence;

marking cells composed of the row characters and the column characters in the label table as having or not having entity category labels or relationship category labels;

taking each sample sentence in the sample set as input information to a model to be trained and the label table corresponding to each sample sentence as output information of the model to be trained, and performing model training according to a preset target function;

processing characters of target sentence according to an entity relationship extraction model to generate a target label table corresponding to the target sentence, wherein the target label table comprises predicted scores corresponding to the cells composed of the row characters and the column characters;

calculating the predicted scores corresponding to the cells composed of the row characters and the column characters in the target label table to determine segmentation positions related to the entity category labels in the target label table;

determining whether the predicted scores for the cells in a diagonal line in the target label table meet the entity category labels according to the segmentation positions, and if yes, marking with the corresponding entity category labels;

determining whether the predicted scores for the cells not in the diagonal line in the target label table meet the relationship category labels according to the segmentation positions, and if yes, marking with the corresponding relationship category labels; and generating entities of the target sentence and a relationship between entities of the target sentence according to the entity category labels and the relationship category labels marked in the target label table.

2. The information obtaining method according to claim 1, further comprising:

if the sample sentence is an English sentence, identically setting the row characters and the column characters of the label table in accordance with an order of words of the corresponding English sentence; and if the sample sentence is a Chinese sentence, identically setting the row characters and the column characters of the label table in accordance with the order of characters of the corresponding Chinese sentence.

3. The information obtaining method according to claim 1, wherein the marking the cells composed of the row characters and the column characters in the label table as having or not having the entity category labels or the relationship category labels comprises:

marking the cells composed of the row characters and the column characters in the diagonal line of the label table as having or not having the entity category labels; and marking the cells composed of the row characters and the column characters not in the diagonal line of the label table as having or not having the relationship category labels, wherein the relationship category labels are distributed symmetrically or asymmetrically about the diagonal line of the label table.

4. The information obtaining method according to claim 1, wherein the preset target function corresponding to the entity relationship extraction model comprises a first loss function which is determined by:

determining a label classification probability representing the entity category label or the relationship category label corresponding to each cell in the label table corresponding to each sample sentence according to a biaffine classification algorithm; and calculating the label classification probability representing the entity category label or the relationship category label corresponding to each cell to determine the first loss function.

5. The information obtaining method according to claim 4, wherein the preset target function corresponding to the entity relationship extraction model comprises a second loss function which is determined by:

calculating entity category label probabilities in the diagonal line of the label table and relationship category label probabilities distributed symmetrically about the diagonal line to determine the second loss function.

6. The information obtaining method according to claim 5, wherein the preset target function corresponding to the entity relationship extraction model comprises a third loss function which is determined by:

calculating entity category label probabilities in the diagonal line of the label table according to a preset algorithm to determine the third loss function.

7. An electronic device, comprising:

a processor; and a memory configured to store instructions executable by the processor, wherein the processor is configured to read the executable instructions from the memory and execute the instructions to implement an information obtaining method, wherein the method comprises:

setting a label table corresponding to each sample sentence in a sample set, wherein row characters and column characters in the label table are set identically in accordance with an order of characters of the corresponding sample sentence;

marking cells composed of the row characters and the column characters in the label table as having or not having entity category labels or relationship category labels;

taking each sample sentence in the sample set as input information to a model to be trained and the label table corresponding to each sample sentence as output information of the model to be trained, and performing model training according to a preset target function;

processing characters of target sentence according to an entity relationship extraction model to generate a target label table corresponding to the target sentence, wherein the target label table comprises predicted scores corresponding to the cells composed of the row characters and the column characters;

calculating the predicted scores corresponding to the cells composed of the row characters and the column characters in the target label table to determine segmentation positions related to the entity category labels in the target label table;

determining whether the predicted scores for the cells in a diagonal line in the target label table meet the entity category labels according to the segmentation positions, and if yes, marking with the corresponding entity category labels;

determining whether the predicted scores for the cells not in the diagonal line in the target label table meet the relationship category labels according to the segmentation positions, and if yes, marking with the corresponding relationship category labels; and generating entities of the target sentence and a relationship between entities of the target sentence according to the entity category labels and the relationship category labels marked in the target label table.

8. The electronic device according to claim 7, wherein the method further comprises:

if the sample sentence is an English sentence, identically setting the row characters and the column characters of the label table in accordance with an order of words of the corresponding English sentence; and if the sample sentence is a Chinese sentence, identically setting the row characters and the column characters of the label table in accordance with the order of characters of the corresponding Chinese sentence.

9. The electronic device according to claim 7, wherein the marking the cells composed of the row characters and the column characters in the label table as having or not having the entity category labels or the relationship category labels comprises:

marking the cells composed of the row characters and the column characters in the diagonal line of the label table as having or not having the entity category labels; and marking the cells composed of the row characters and the column characters not in the diagonal line of the label table as having or not having the relationship category labels, wherein the relationship category labels are distributed symmetrically or asymmetrically about the diagonal line of the label table.

10. The electronic device according to claim 7, wherein the preset target function corresponding to the entity relationship extraction model comprises a first loss function which is determined by:

determining a label classification probability representing the entity category label or the relationship category label corresponding to each cell in the label table corresponding to each sample sentence according to a biaffine classification algorithm; and calculating the label classification probability representing the entity category label or the relationship category label corresponding to each cell to determine the first loss function.

11. The electronic device according to claim 10, wherein the preset target function corresponding to the entity relationship extraction model comprises a second loss function which is determined by:

calculating entity category label probabilities in the diagonal line of the label table and relationship category label probabilities distributed symmetrically about the diagonal line to determine the second loss function.

12. The electronic device according to claim 11, wherein the preset target function corresponding to the entity relationship extraction model comprises a third loss function which is determined by:

calculating entity category label probabilities in the diagonal line of the label table according to a preset algorithm to determine the third loss function.

13. A non-transitory computer-readable storage medium, storing a computer program configured to perform an information obtaining method, wherein the method comprises:

setting a label table corresponding to each sample sentence in a sample set, wherein row characters and column characters in the label table are set identically in accordance with an order of characters of the corresponding sample sentence;

marking cells composed of the row characters and the column characters in the label table as having or not having entity category labels or relationship category labels;

taking each sample sentence in the sample set as input information to a model to be trained and the label table corresponding to each sample sentence as output information of the model to be trained, and performing model training according to a preset target function;

processing characters of target sentence according to an entity relationship extraction model to generate a target label table corresponding to the target sentence, wherein the target label table comprises predicted scores corresponding to the cells composed of the row characters and the column characters;

calculating the predicted scores corresponding to the cells composed of the row characters and the column characters in the target label table to determine segmentation positions related to the entity category labels in the target label table;

determining whether the predicted scores for the cells in a diagonal line in the target label table meet the entity category labels according to the segmentation positions, and if yes, marking with the corresponding entity category labels;

determining whether the predicted scores for the cells not in the diagonal line in the target label table meet the relationship category labels according to the segmentation positions, and if yes, marking with the corresponding relationship category labels; and generating entities of the target sentence and a relationship between entities of the target sentence according to the entity category labels and the relationship category labels marked in the target label table.

14. The non-transitory computer-readable storage medium according to claim 13, wherein the method further comprises:

if the sample sentence is an English sentence, identically setting the row characters and the column characters of the label table in accordance with an order of words of the corresponding English sentence; and if the sample sentence is a Chinese sentence, identically setting the row characters and the column characters of the label table in accordance with the order of characters of the corresponding Chinese sentence.

15. The non-transitory computer-readable storage medium according to claim 13, wherein the marking the cells composed of the row characters and the column characters in the label table as having or not having the entity category labels or the relationship category labels comprises:

marking the cells composed of the row characters and the column characters in the diagonal line of the label table as having or not having the entity category labels; and marking the cells composed of the row characters and the column characters not in the diagonal line of the label table as having or not having the relationship category labels, wherein the relationship category labels are distributed symmetrically or asymmetrically about the diagonal line of the label table.

16. The non-transitory computer-readable storage medium according to claim 13, wherein the preset target function corresponding to the entity relationship extraction model comprises a first loss function which is determined by:

determining a label classification probability representing the entity category label or the relationship category label corresponding to each cell in the label table corresponding to each sample sentence according to a biaffine classification algorithm; and calculating the label classification probability representing the entity category label or the relationship category label corresponding to each cell to determine the first loss function.

17. The non-transitory computer-readable storage medium according to claim 16, wherein the preset target function corresponding to the entity relationship extraction model comprises a second loss function which is determined by:

calculating entity category label probabilities in the diagonal line of the label table and relationship category label probabilities distributed symmetrically about the diagonal line to determine the second loss function.

18. The non-transitory computer-readable storage medium according to claim 17, wherein the preset target function corresponding to the entity relationship extraction model comprises a third loss function which is determined by:

calculating entity category label probabilities in the diagonal line of the label table according to a preset algorithm to determine the third loss function.

* * * * *